United States Patent Office 3,288,610
Patented Nov. 29, 1966

3,288,610
OPTICALLY SENSITIZED PHOTOGRAPHIC SILVER HALIDE EMULSIONS
Johannes Götze, Bergisch-Neukirchen, and Helmut Kampfer, Cologne-Stammheim, Germany, assignors to Agfa Aktiengesellschaft, Leverkusen, Germany, a corporation of Germany
No Drawing. Filed Oct. 6, 1964, Ser. No. 402,006
Claims priority, application Germany, Oct. 26, 1963, A 44,406
6 Claims. (Cl. 96—106)

The invention relates to photographic silver halide emulsions optically sensitized with merocyanine dyes at least one of the heterocyclic nitrogen atoms of which is substituted by a hydroxypropyl sulfonic radical, the hydroxy group of which may be substituted with an acyl group.

Merocyanine dyes, the nitrogen atoms in the heterocyclic rings of which are substituted by alkyl radicals, are generally insoluble in water and almost insoluble in organic solvents. This disadvantage can be overcome by substituting at least one of the alkyl radicals attached to the nitrogen atoms of the heterocyclic rings by a water-solubilizing group, in particular sulfo groups. Although, the water solubility of the resulting dyes is sufficient and the dyes can be washed out satisfactorily from the emulsion layers, the sensitizing effect is insufficient. Particularly the decay of the senitization of these sensitizing dyes is not steep enough towards longer wavelength so that the dark room safety of such sensitizers does not meet the requirements.

It is an object of the invention to provide new merocyanine dyes, at least one of the heterocyclic atoms of which is substituted by a hydroxypropyl sulfonic acid group which may be acylated. Another object is to provide methods for making these merocyanine dyes. Still another object is to provide photographic emulsions sensitized with these merocyanine dyes. Other objects will become apparent from a consideration of the following description and examples.

The above objects have been attained by providing merocyanine dyes in particular dimethine merocyanines in which at least one of the heterocyclic nitrogen atoms is substituted by a hydroxypropyl sulfonic acid radical, the hydroxy group of which is preferably acylated. These dyes are excellent sensitizers for silver halide emulsions.

Especially suitable are merocyanines containing, as one of the heterocyclic groups, a benzoxazole or benzthiazole group in which the nitrogen atom is substituted with an oxypropyl sulfonic acid radical acylated, if desired and in which the benzene rings of the radicals can be substituted, for example, by halogen atoms, or alkyl preferably alkyl having up to 5 carbon atoms, alkoxy the alkyl group of which having up to 5 carbon atoms or aryl groups such as phenyl or naphthyl, in the 5-position and/or the 6-position.

Particular utility exhibit sensitizers of the following formula:

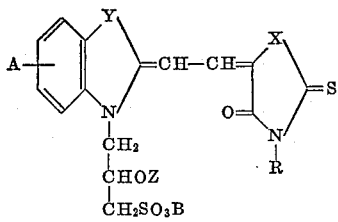

wherein
Y represents an oxygen or sulfur atom;
X represents an oxygen or sulfur atom or the groups
>N–R and —CONR—;

Z represents a hydrogen atom or preferably an acyl group, particularly acyl groups derived from lower aliphatic acid having up to 5 carbon atoms such as acetyl, propionyl and the like;
R represents alkyl preferably lower alkyl having up to 5 carbon atoms such as methyl or ethyl, aryl such as phenyl or naphthyl, preferably phenyl, or aralkyl preferably phenyl alkyl such as benzyl or phenyl ethyl;
A represents hydrogen, halogen such as chlorine or bromine, alkyl preferably lower alkyl having up to 5 carbon atoms such as methyl or ethyl, aryl preferably phenyl, aralkyl such as benzyl or phenyl ethyl or alkoxy group, the alkyl group of which having preferably up to 5 carbon atoms, hydroxy, carboxyl or esterified carboxyl in particular with lower aliphatic alcohols having up to 5 carbon atoms such as carbomethoxy or carboethoxy, heterocyclic groupings, such as thienyl or furyl or one or more of those substituents which are usuall in cyanine chemistry, preferably in the 5-position and/or 6-position, A may further represent an aryl ring, preferably a phenyl ring, fused to the benzene ring and in particular in the 5,6-position, and
B represents a cation such as a hydrogen cation, a cation of alkali or earth alkali metals such as sodium, potassium or calcium or ammonium cations. The nature of the cation is not critical and can be selected in accordance with the requirements of the methods of preparation of the sensitizing dye.

The sensitizing dyes of the invention are prepared by quaternizing the nitrogenous heterocyclic bases which are usual in cyanine chemistry, such as 2-methylbenzoxazole, 2,5-dimethylbenzoxazole, 2-methyl-5-chlorobenzoxazole, 2-methylbenzthiazole, substituted 2-methylbenzthiazoles with 3-chloro-2-hydroxy propane-1-sulfonic acid, which can be prepared as follows:

Epichlorohydrin is, as known from the literature (Ber. 61 (1928) page 1354), reacted in a simple manner with acid sodium sulfite or pyrosulfite to form the salt of 3-chloro-2-hydroxypropane sulfonic acid. The free acid is obtained from the aqueous solution of this salt by using an ion exchange column. After evaporation of the water in vacuo, this free acid is present as semi-solid substance.

In the reaction of 3-chloro-2-hydroxypropane-1-sulfonic acid with 2-methylbenzthiazole or its derivatives substituted in the benzene nucleus (e.g. 2,5-dimethylbenzthiazole, 2,6 - dimethylbenzthiazole, 2,5,6-trimethylbenzthiazole, 2-methyl-5- or 6-methoxybenzthiazole or 2-methyl-5-chlorobenzthiazole), hydrochloric acid is split off (the chlorohydrates of the benzthiazole bases may be isolated by sublimation) and the quaternary salts of Formula II are formed.

The quaternization of the benzoxazole bases can, for example, be performed by heating 1 mol of 3-chloro-2-hydroxypropane-1-sulfonic acid with 2 mols of benzoxazole base, for example, in tetralin. The tetralin and the benzoxazole hydrochloride formed in the reaction are distilled off together.

Generally theresidue of the reaction can be treated with isopropanol and ethyl acetate as solvent, to isolate the quaternary betains, for example, those of Formula II, as hygroscopic substances. Occasionally, these betains appear to exist in the open form IIa, but the latter compounds are converted back to the form represented by Formula II on further processing.

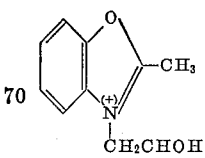

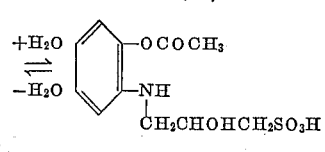

These reaction products are then reacted according to common practice either directly with suitable derivatives of heterocyclic compounds to form the merocyanine dyes (see Example 3) or they are initially transformed into intermediate products, for example, those of the Formula III.

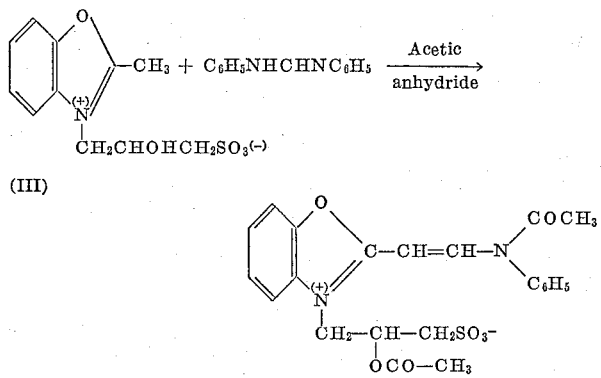

(III)

Since the condensation with diphenylformamidine is carried out in the presence of carboxylic anhydrides, more especially acetic anhydride, the hydroxyl group of the nitrogen substituent is simultaneously acylated, so that the products obtained have the Formula III. These intermediate products of type III can be condensed in suitable solvents, such as alcohol, pyridine or acetic anhydride, with the addition of condensation agents, such as triethylamine or alkali metal alcoholates. The compounds of type III react with compounds which contain reactive methylene groups (such as rhodanines, thiohydantoins or thiobarbituric acid) to form dimethine dyes.

The intermediate products, for example, the product III, can be synthesized as follows:

40 g. of the quaternary betains are dissolved on a steam bath in 100 cc. of acetic anhydride. 63 g. of diphenylformamidine are added and the mixture heated for 30 minutes. The desired intermediate is precipitated by addition of ethyl acetate as yellowish-orange powder.

The present invention includes sensitizing dyes which in principle correspond to Formula I, wherein however the benzthiazole or benzoxazole groupings are replaced by other 5- or 6-membered heterocyclic rings which are usual in cyanine chemistry, for example, oxazoles, selenazole, oxazines, benzoxazines, thiazoles, benzselenazole, naphthoselenazoles, thiodiazoles, oxadiazoles, imidazoles, benzimidazoles, pyrimidines, pyridines, quinolines, isoquinolines, thiazolines or indolenines.

Preferred, however, are sensitizing dyes according to Formula I, more particular those in which the benzene ring is unsubstituted or is substituted with methyl groups in the 5- and/or 6-position or chlorine atoms in the 5-position or in which further benzene nuclei are fused to the benzene rings of the heterocyclic groupings.

The merocyanine dyes of the present invention are characterized by the following advantages:

(a) Excellent sensitizing action both in black-and-white and color photographic silver halide emulsions;

(b) A very sharp decay of the sensitization curve towards the region of the longer wavelength and in consequence thereof a high dark room safety of the photographic material, sensitized by the present merocyanines;

(c) No coloring of the emulsions sensitized with the merocyanines; the dyes are washed out completely;

(d) The dyes can be prepared in a very simple manner.

Silver halide emulsion layers which contain silver chloride, silver bromide or mixtures thereof and which might additionally contain up to 10 mol percent of silver iodide can be used as light-sensitive layers. Gelatin is preferred as binder for the light-sensitive layers, but this can be wholly or partially replaced by other layer-forming, hydrophilic colloids, depending upon the properties which are required. Suitable, for example, are polyvinyl alcohol, polyvinyl pyrrolidone, starch or starch ether, alginic acid and derivatives thereof such as salts particularly with alkali metals, esters or amides, or carboxymethyl cellulose and the like.

The dyes of the present invention are advantageously incorporated in the washed and finished emulsion and should be uniformly distributed throughout the emulsion. The methods of incorporating the dyes in an emulsion are simple and well known to those skilled in the art of emulsion making. It is convenient to add the dyes from solution in appropriate solvents such as alcohols and phenols or in a mixture of those solvents with water. The solvent must be compatible with the emulsion and substantially free from any deleterious effect on the silver halide emulsion. Water or methanol or a mixture thereof has proven satisfactory as a solvent for the majority of the new dyes.

The concentration of the sensitizing dyes of the present invention in the silver halide emulsion can vary widely, for example, from about 2 to 200 mg. preferably 10 to 60 mg. per kg. of the emulsion. The concentration of the dye will vary according to the type of light-sensitive material in the emulsion and according to sensitization desired. The suitable and optimal concentration for any given emulsion will be apparent to those skilled in the art upon making the ordinary tests customarily used in the art of emulsion making.

The dyestuffs are in addition particularly insensitive to other additives which are commonly used, for example, wetting agents, stabilizers, bactericides, fungicides, hardeners and developers added to the layer, and also to other additives, such as color couplers, in their water-soluble or emulsified form, and to other dyestuffs such as antihalo or filter dyes or in the silver-dye-bleach process, for example, azo dyestuffs.

The dyes according to the invention are also suitable for the optical sensitization of electrophotographic semiconductor layers, more especially zinc oxide layers. The sensitizing dyes may also be used for emulsions intended for use in silver dye bleach processes.

EXAMPLE 1

*Sensitizing dye 1*

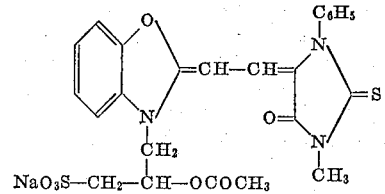

*Preparation.*—The following starting compound is used:

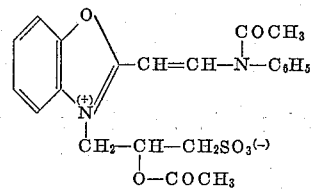

6.7 g. of this compound are heated with 5.2 g. of 1-phenyl-3-methylthiohydantion in 125 cc. of ethanol and 10 cc. of triethylamine for 50 minutes on a steam bath. The reaction solution is filtered hot and ether is added to the filtrate. The ether filtered off is mixed with common salt solution and the dye precipitates from the separated layer. It is suction-filtered, dried and recrystallized from methanol/isopropanol. It has a melting point of 375° C. and sensitized with a maximum at 530/μ with very high grain sensitivity. The sensitizer does not show any dyeing of a photographic layer.

EXAMPLE 2

Sensitizing dye 2

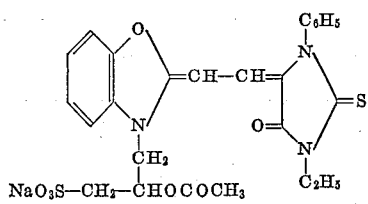

*Preparation.*—The dye is formed by heating 30 g. of the intermediate product mentioned in the preceding example with 25 g. of 1-phenyl-3-ethylthiohydantion, 540 cc. of ethanol and 43 cc. of triethylamine for 60 minutes on a steam bath. The dye spontaneously separates out. It can be reacted to form the sodium salt, which crystallizes with 1 mol of water as shown by the analysis below.

Empirical formula: $C_{25}H_{24}O_7N_3S_2Na \cdot H_2O$. Calculated: C, 51.3%; H, 4.4%; O, 22.0%; N, 7.2%; S, 11.0%. Found: C, 50.8%, 51.0%; H, 4.7%, 5.1%; O, 20.9%, 21.2%; N, 7.3%; S, 10.7%, 10.9%.

The dye melts above 360° C., has an absorption maximum in methanol at 480μ and a sensitization maximum of 535μ.

EXAMPLE 3

Sensitizing dye 3

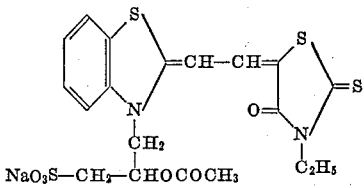

*Preparation.*—2.9 of the quaternary salt of the formula:

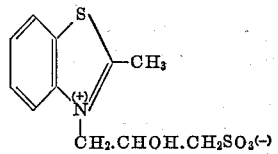

and 2.6 g. of the compound

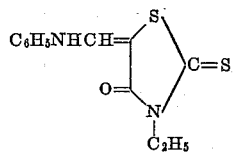

are refluxed in 30 cc. of acetic anhydride and 5 cc. of triethylamine for 1 hour. The reaction mixture is poured into ether, the precipitated green grease is extracted by boiling with ether several times, dissolved in water and the dye is precipitated with sodium chloride solution. The crude dye is triturated with ether and isopropanol and recrystallized from a mixture of methanol/isopropanol. It has a melting point of 342° C., an absorption maximum at 525μ and a sensitization maximum at 590μ.

EXAMPLE 4

Sensitizing dye 4

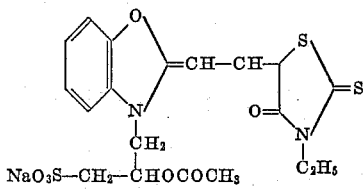

M.P. 375° C.

*Preparation.*—4.6 g. of the starting compound of Example 1 and 3.0 g. of N-ethylrhodanine are refluxed for 30 minutes in a mixture of 80 ml. of acetonitrile and 12 ml. of triethylamine.

Upon cooling a precipitate is formed which is filtered. The filtrate is mixed with the saturated aqueous solution of sodium chloride and ether. The dye precipitates at the interface between ether and aqueous phase. The crystals are suction filtered.

This dye has a sensitization maximum at 560μ.

EXAMPLE 5

Sensitizing dye 5

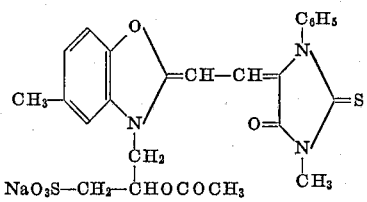

*Preparation.*—14.5 g. of the intermediate product:

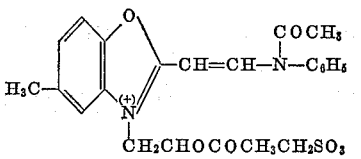

10 g. of 1-phenyl-3-methylthiohydantoin, 100 cc. of acetonitrile and 25 cc. of triethylamine are heated for 30 minutes on a steam bath. The dye can be purified as described in Examples 1 or 2. Sensitization maximum at 535μ.

EXAMPLE 6

Sensitizing dye 6

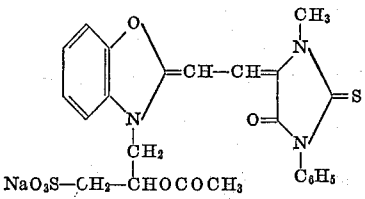

*Preparation.*—The dye is prepared as described in Example 2 from the intermediate product III, and 1-methyl-3-phenylthiohydantoin. The melting point is 381° C. and the sensitization maximum at 530μ.

EXAMPLE 7

Sensitizing dye 7

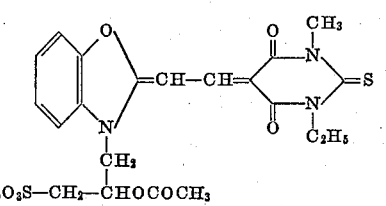

*Preparation.*—9.2 g. of the intermediate product III and 7.4 g. of N-methyl-N-ethylthiobarbituric acid are heated in alcohol with triethylamine for 30 minutes on a steam bath. The dye crystallizes out from the reaction mixture. It is purified by recrystallization twice from methanol, with addition of water. M.P. 385° C., sensitization maximum 495μ.

EXAMPLE 8

Sensitizing dye 8

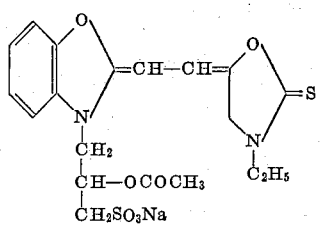

*Preparation.*—10 g. of the intermediate product III, 5 g. of 3-methyl-2-thio-4-oxazolidone, 100 cc. of acetonitrile and 5 cc. of triethylamine are heated for 30 minutes on a steam bath. The reaction mixture is filtered off from a small quantity of a precipitate and about 0.5 liter of ether is added to the filtrate. After some time it is filtered again and approximately 100 cc. of saturated sodium chloride solution and 10 cc. of water are added to the filtrate. The dye is precipitated from the water-ether layer. It is suction-filtered after 24 hours, dried and recrystallized from a mixture of methanol and isopropanol.

M.P. 285° C. The sensitization maximum of a silver chlorobromide emulsion, such as used for reproduction purposes is at 520μ.

EXAMPLE 9

The following example will serve to illustrate the advantages of the merocyanines of the present invention:

An ordinary photographic silver chlorobromide emulsion chemically sensitized with gold (III) chloride and stabilized with phenyl mercaptotetrazole was divided into 3 portions. 30 mg. of the sensitizing dye 2 and of the following prior art sensitizers A and B were then added in solutions in a mixture of methanol and water.

(A)

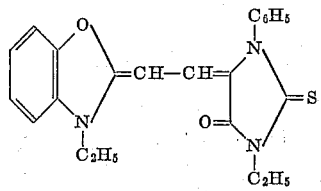

(B)

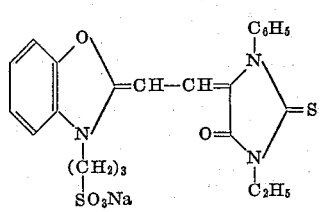

The portions of the emulsion were then coated on a transparent support such as polyethylene terephthalate and dried. The dried coatings were exposed according to common practice to a stepped test wedge, the rise of the wedge being $\sqrt[3]{2}$ per step. The exposed coatings were developed for about 5 minutes in a photographic developer having the following composition:

1.0 g. of p-methylaminophenol
3.0 g. of hydroquinone
13.0 g. of sodium sulfite sicc.
26.0 g. of sodium carbonate
1.0 g. of potassium bromide
Water to make 1 liter Another series of tests were run to show the dark room safety of the photographic materials. The portions of the above coatings were exposed to light behind a red filter (Agfa No. 104) behind a test wedge having 5 steps of increasing density in factors 1, 2, 4, 8 and 16. The higher the numbers of the steps visible after processing the less satisfactory is the dark room safety. The development was accomplished as described above. The results are given in the following table:

| Sensitizing dye | Sensitivity | Darkroom safety | Coloring of the layer |
|---|---|---|---|
| A | *19 | *4 | Strong. |
| B | 18 | 4 | None. |
| 2 | 19 | 2 | None. |

*Steps visible.

The dark room safety of the photographic material containing the merocyanine of the invention is readily apparent from the above table. Similar results are obtained if the sensitizing dye 2 is replaced by any oher sensitizer of the present invention.

We claim:

1. An optically sensitive silver halide emulsion containing a sensitizing amount of a dimethine merocyanine dye having the following formula

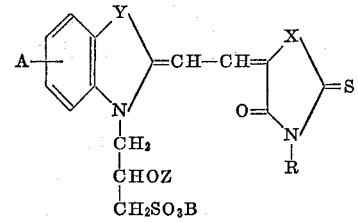

wherein

Y represents a bivalent radical of the group consisting of oxygen and sulfur;
X stands for a radical of the group consisting of oxygen, sulfur, an imino radical of the formula

and a carbonimido radical of the formula —CONR—;
Z represents a member of the group consisting of hydrogen and acyl;
R represents a group of the class consisting of alkyl having up to 5 carbon atoms, phenyl, naphthyl and phenyl alkyl;
A stands for a substituent of the group consisting of hydrogen, alkyl having up to 5 carbon atoms, phenyl, phenyl alkyl, alkoxy having up to 5 carbon atoms, hydroxy, carboxyl, esterified carboxyl, heterocyclic groups and a fused-on phenyl ring;
B stands for a cation.

2. An emulsion as defined in claim 1 in which the dye has the following formula

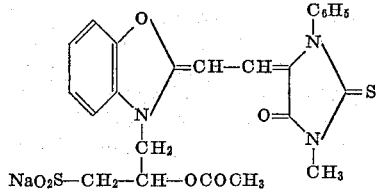

3. An emulsion as defined in claim 1 in which the dye has the following formula

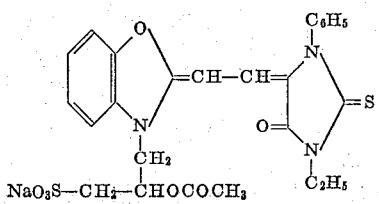

4. An emulsion as defined in claim 1 in which the dye has the following formula

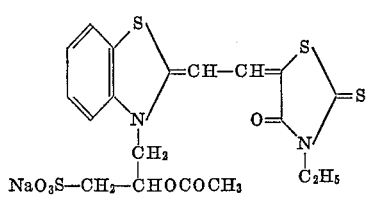

5. An emulsion as defined in claim 1 in which the dye has the following formula

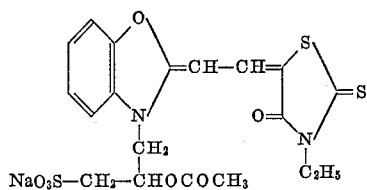

M.P. 375° C.

6. An emulsion as defined in claim 1 in which the dye has the following formula

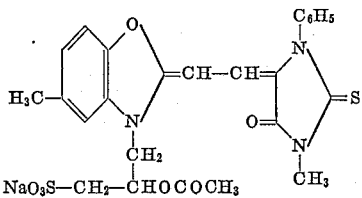

References Cited by the Examiner
UNITED STATES PATENTS

| | | | |
|---|---|---|---|
| 2,304,981 | 12/1942 | Wilmanns | 96—106 |
| 2,870,014 | 1/1959 | Brooker et al. | 96—106 |
| 2,895,955 | 7/1959 | Haseltine et al. | 260—240.5 |
| 2,984,664 | 5/1961 | Fry et al. | 260—240.5 |
| 3,177,210 | 4/1965 | Rosenoff | 96—106 |

FOREIGN PATENTS 742,112   12/1955   Great Britain.

NORMAN G. TORCHIN, *Primary Examiner.*

J. TRAVIS BROWN, *Assistant Examiner.*